(12) United States Patent
Jolliffe et al.

(10) Patent No.: US 11,724,172 B2
(45) Date of Patent: Aug. 15, 2023

(54) BALL GAME APPARATUS

(71) Applicant: World Golf Systems Limited, Northwood (GB)

(72) Inventors: David Victor Jolliffe, Northwood (GB); Steven Paul Jolliffe, Northwood (GB)

( * ) Notice: Subject to any disclaimer, the term of this patent is extended or adjusted under 35 U.S.C. 154(b) by 0 days.

(21) Appl. No.: 15/743,269

(22) PCT Filed: Jul. 8, 2016

(86) PCT No.: PCT/GB2016/052069
§ 371 (c)(1),
(2) Date: Jan. 9, 2018

(87) PCT Pub. No.: WO2017/006133
PCT Pub. Date: Jan. 12, 2017

(65) Prior Publication Data
US 2018/0200601 A1    Jul. 19, 2018

(30) Foreign Application Priority Data
Jul. 9, 2015    (GB) ..................... 1512037

(51) Int. Cl.
*A63B 43/00* (2006.01)
*A63B 71/06* (2006.01)
(Continued)

(52) U.S. Cl.
CPC ...... *A63B 71/0605* (2013.01); *A63B 37/0003* (2013.01); *A63B 43/00* (2013.01);
(Continued)

(58) Field of Classification Search
CPC ............ A63B 24/0021; A63B 2225/15; A63B 2225/50; A63B 2225/54; A63B 43/00;
(Continued)

(56) References Cited

U.S. PATENT DOCUMENTS 3,782,730 A * 1/1974 Horchler ............ A63B 24/0021
                                                    473/353
4,516,770 A    5/1985 Brookes et al.
(Continued)

FOREIGN PATENT DOCUMENTS

WO    2010065886 A1    6/2010
WO    2013156778 A1    10/2013

*Primary Examiner* — Laura Davison
(74) *Attorney, Agent, or Firm* — Neal, Gerber & Eisenberg LLP

(57) ABSTRACT

A ball game apparatus in which movements of a coded ball (20) are detected by detector units (100, 206) and an automatic indication of a player's score is given, where data relating to the ball (20) are stored in a database connected to the detector units (100, 206), the data including the code of a ball (20) and a code relating to a player to whom the ball (20) has been allocated, the ball (20) being configured to temporarily store, and to intermittently transfer to the detector units (100, 206) and thence to the database, data relating to the ball's movements. A rechargeable battery (40) is contained within the ball (20), and is arranged to be charged by a battery charging system. Features of the game may be controlled by means of a player's mobile telephone.

17 Claims, 2 Drawing Sheets

(51) Int. Cl.
  *A63B 37/00* (2006.01)
  *H02J 7/00* (2006.01)
  *H02J 50/10* (2016.01)

(52) U.S. Cl.
  CPC ........ *A63B 43/004* (2013.01); *A63B 71/0622* (2013.01); *H02J 7/0013* (2013.01); *H02J 7/0044* (2013.01); *H02J 50/10* (2016.02); *A63B 2220/12* (2013.01); *A63B 2220/80* (2013.01); *A63B 2220/805* (2013.01); *A63B 2220/806* (2013.01); *A63B 2225/15* (2013.01); *A63B 2225/20* (2013.01); *A63B 2225/30* (2013.01); *A63B 2225/50* (2013.01); *A63B 2225/54* (2013.01)

(58) Field of Classification Search
  CPC .............. A63B 37/0003; A63B 43/004; A63B 71/0605; H02J 50/10; H01H 2239/024
  USPC .................................................. 473/199, 353
  See application file for complete search history.

(56) References Cited

U.S. PATENT DOCUMENTS

| | | | |
|---|---|---|---|
| 4,528,548 A | | 7/1985 | Oberan |
| 4,673,183 A | | 6/1987 | Trahan |
| 5,342,053 A | | 8/1994 | Smith |
| 5,370,389 A | | 12/1994 | Reising |
| 5,413,345 A | * | 5/1995 | Nauck ................ A63B 24/0003 348/157 |
| 5,439,224 A | | 8/1995 | Bertoncino |
| 5,445,374 A | | 8/1995 | Clark, Jr. |
| 5,487,542 A | * | 1/1996 | Foley ................ A63B 24/0021 473/151 |
| 5,505,452 A | | 4/1996 | Meaden |
| 5,582,550 A | | 12/1996 | Foley |
| 5,626,531 A | | 5/1997 | Little |
| 5,632,687 A | | 5/1997 | Bunyi |
| 5,653,642 A | | 8/1997 | Bonacorsi |
| 5,743,804 A | | 4/1998 | Bacon |
| 5,743,815 A | | 4/1998 | Helderman |
| 5,860,648 A | | 1/1999 | Petermeier et al. |
| 5,916,033 A | | 6/1999 | Doherty |
| 5,976,038 A | | 11/1999 | Orenstein et al. |
| 6,113,504 A | | 9/2000 | Kuesters |
| 6,270,433 B1 | | 8/2001 | Orenstein et al. |
| 6,299,553 B1 | | 10/2001 | Petuchowski et al. |
| 6,322,455 B1 | | 11/2001 | Howey |
| 6,337,560 B1 | * | 1/2002 | Kalogeropoulos ... H02J 7/0073 320/125 |
| 6,338,685 B1 | | 1/2002 | Posluszny |
| 6,348,017 B1 | | 2/2002 | Yates |
| 6,607,123 B1 | * | 8/2003 | Jollifee ............... A63B 24/0021 235/375 |
| 7,040,998 B2 | * | 5/2006 | Jolliffe ............... A63B 24/0021 473/131 |
| 7,391,182 B2 | * | 6/2008 | Barbeau ................. F21L 2/00 320/107 |
| 7,952,322 B2 | * | 5/2011 | Partovi ................ H01F 5/003 320/108 |
| 8,257,189 B2 | * | 9/2012 | Koudele ............... A63B 43/00 473/155 |
| 8,905,855 B2 | | 12/2014 | Fitzpatrick et al. |
| 9,498,680 B2 | * | 11/2016 | Luciano, Jr. ........ A63B 37/005 |
| 9,808,677 B2 | * | 11/2017 | Jolliffe ............. G09B 19/0038 |
| 10,076,685 B2 | * | 9/2018 | King ..................... H02J 50/40 |
| 2002/0091017 A1 | | 7/2002 | Kuesters |
| 2003/0228934 A1 | | 12/2003 | Corzilius et al. |
| 2007/0026968 A1 | | 2/2007 | Ratcliffe |
| 2009/0280920 A1 | | 11/2009 | Rankin |
| 2010/0069181 A1 | | 3/2010 | Lin |
| 2010/0285903 A1 | | 11/2010 | Nicodem |
| 2011/0159977 A1 | | 6/2011 | Pelz |
| 2011/0237367 A1 | | 9/2011 | Kodama et al. |
| 2011/0304497 A1 | | 12/2011 | Molyneux et al. |
| 2012/0052971 A1 | | 3/2012 | Bentley |
| 2013/0274040 A1 | | 10/2013 | Coza et al. |
| 2014/0081940 A1 | * | 3/2014 | Everett ............. G06F 17/30091 707/705 |

* cited by examiner

BALL GAME APPARATUS

The present invention relates to a ball game apparatus. More particularly it relates to apparatus in which the motion of a ball is detected and an indication of the players' scores are given. An indication may be given of inadvertent and/or other movements of the ball which do not correspond to the rules of the game.

International patent application WO 2013/156778 discloses a golfing game in which a control device determines a predetermined range of allowable movements of a golf ball. Actual movements of the ball are sensed and a comparison is made as to whether they fall within the predetermined range.

Aspects of the present invention seek to provide an improved ball game apparatus. Aspects of the present invention seek to provide a golf facility incorporating one or more golf holes comprising the above ball game apparatus and a reception area. The reception area can include one or more of: means for charging the batteries of coded golf balls; means for switching on the golf balls from a dormant condition; means for providing a player code to a golf ball; means for allocating a profile to a golf ball depending upon the type of player, one or more vending machines which can be actuated by a coded golf ball, a central database which stores information relating to the various functions and a central control unit which controls the various functions accordingly.

According to a first aspect of the present invention, there is provided a ball game apparatus in which movements of a coded ball are detected by detector units and an automatic indication of a player's score is given, wherein data relating to the ball are stored in a database connected to the detector units, the data including the code of a ball and a code relating to a player to whom the ball has been allocated, the ball being configured to temporarily store, and to intermittently transfer to the detector units and thence to the database, data relating to the movements of the ball.

The database preferably stores data relating to a history of charging cycles which have been applied to a battery within the ball. This enables it to be monitored when a battery within a ball needs replacing.

The apparatus may further comprise a mobile communication device, such as a player's mobile telephone, which is configured to indicate the player's score and/or to influence other parts of the apparatus. The ability to use a mobile telephone makes it easy for players to interact with the game. The ability to control other parts of the apparatus, such as features of a novelty golf game, makes the game more interesting for players.

In preferred embodiments, the ball has a circuit which transmits signals which vary in power in dependence upon the current motion of the ball and/or each detector unit transmits signals which vary power in dependence upon the proximity of the nearest ball. Using reduced power in the ball has the advantage of conserving battery power. Varying the power transmitted by detector units has the advantage of avoiding interference between adjacent holes of a golf facility incorporating the ball game apparatus.

The apparatus may include a reading apparatus configured to read the data from the ball at the start and/or at the end of a game. The reading apparatus preferably includes an activator unit which is configured to switch the ball between an "on" and an "off" condition.

Movement of the ball may be recorded throughout a game by video cameras which are connected to a control centre. In addition, one or more video screens may be distributed around a course on which the game is played, the screens being connected to one or more respective cameras and/or to the control centre for selected replay.

Where the ball game apparatus is part of a golf facility, the facility has a relatively large plurality of coded golf balls.

According to a second aspect of the present invention, there is provided a golf facility comprising one or more of:
  (i) means for charging batteries within the balls before a game;
  (ii) means for reading data from the balls at the start and/or at the end of a game;
  (iii) means for switching on the balls at the start of a game and/or for switching the balls off at the end of a game;
  (iv) a plurality of communication beacons distributed around the facility and which function with varying power levels; and/or
  (v) a plurality of video cameras distributed around the facility for recording shots and one or more video display screens for replaying the shots.

According to a third aspect of the present invention, there is providing a method of operating a golf facility, preferably a golf facility in accordance with the second aspect of the invention, including a ball game apparatus using a plurality of coded balls, the method comprising one or more of the following steps:
  (i) charging the batteries within the balls before a game;
  (ii) reading data from the balls at the start of a game;
  (iii) switching on the balls at the start of a game;
  (iv) varying the power of communication from the beacons to the balls and from the balls to the beacons depending upon the position of the balls;
  (v) recording golf shots with video cameras and replaying them on one or more video display screens;
  (vi) reading data from the balls at the end of a game;
  (vii) switching off the balls at the end of a game;
  (viii) influencing parts of the apparatus by means of an application on a player's mobile telephone;
  (ix) erasing data from a ball if it is removed from the facility.

According to a further aspect of the present invention, there is provided a ball game apparatus in which movements of a ball are detected and an automatic indication of a player's score is given, wherein a mobile communication device can be operated to influence the game. The mobile communication device may be a player's mobile telephone with a suitable downloaded application.

According to a further aspect of the present invention, there is provided a battery charging system for charging batteries contained within balls, the system comprising a plurality of battery charging locations each comprising means for holding a ball at a specific position, a sensor for detecting the presence of a ball at said position, a charging coil for inductively coupling with a coil in a held ball. Each location may also comprise means for detecting the temperature of a held ball.

According to a further aspect of the present invention, there is provided a ball game apparatus in which movements of a coded ball are detected by detector units and an automatic indication of a player's score is given, wherein data relating to the ball are stored in a database connected to the detector units, the data including the code of a ball and a code relating to a player to whom the ball has been allocated, the ball being configured to temporarily store, and to intermittently transfer to the detector units and thence to the database, data relating to the ball's movements. The database may also store data relating to a history of charging cycles which have been applied to a battery within the ball.

According to a further aspect of the present invention there is provided a ball game apparatus in which movements of a coded ball are detected by detector units, wherein the ball has a circuit which transmits signals which vary in power in dependence upon the current motion of the ball and/or each detection unit transmits signals which vary power in dependence upon the proximity of the nearest ball.

According to a further aspect of the present invention, there is provided a ball game apparatus, particularly in accordance with any of the preceding aspects, in which movements of a ball are recorded throughout the game by video cameras which are connected to a control centre for selected replay. One or more video screens may be distributed around a course on which the game is played, the screens being connected to one or more respective cameras and/or to the control centre for selected replay.

Preferred embodiments of the present invention will now be described, by way of example only, with reference to the accompanying drawings, of which;

Figure 1:
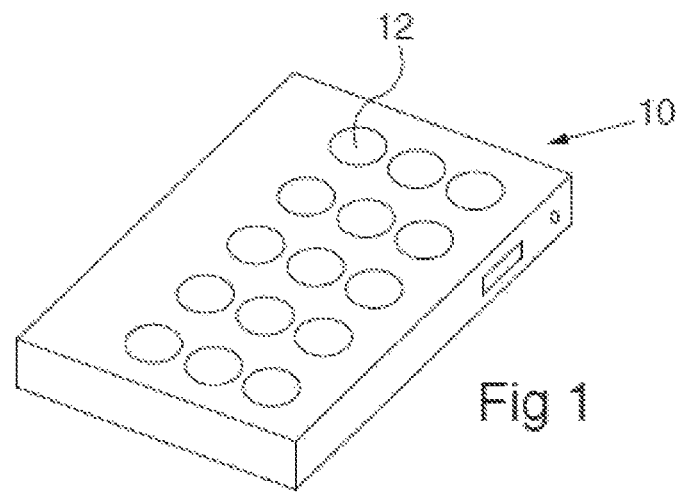
FIG. 1 is a perspective view of a tray used for holding golf balls in a device for charging batteries inside coded golf balls.

FIG. 1 shows a tray 10 used for charging balls used in the apparatus of the present invention. The balls each incorporate a rechargeable battery, an associated charging coil and a chip incorporating a memory and a microprocessor for controlling the battery-charging process. Each ball has a unique "ball" code which is permanently or substantially permanently assigned to each ball in the facility. Further details of the balls are given in our co-pending application number GB 1512038.9 entitled "Ball for Game".

Figure 2:
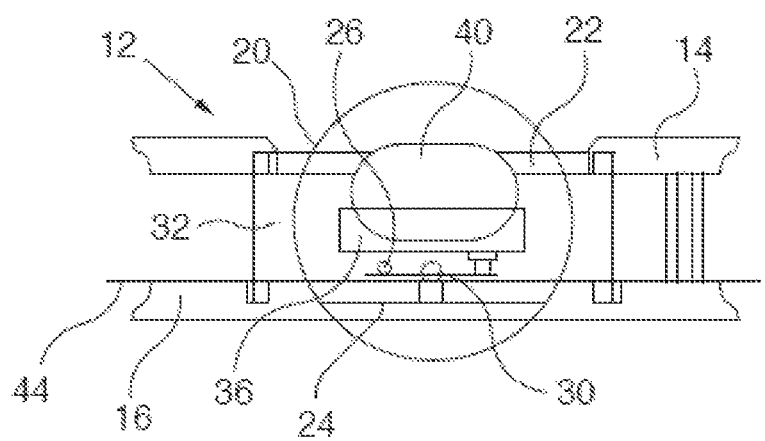
FIG. 2 is a side schematic view of one of the charging locations in the tray of FIG. 1, where relationships between internal and external elements are shown.
Figure 3:
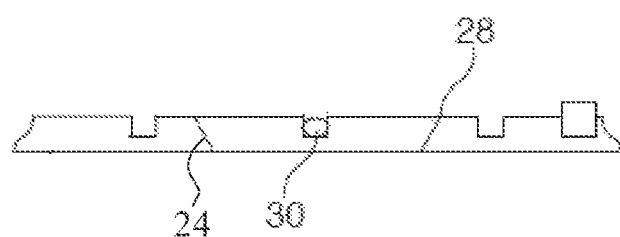
FIG. 3 is a view corresponding to the bottom of FIG. 2, with the golf ball removed.

The tray comprises a three-by-five array of sockets 12 for receiving balls. FIG. 2 shows a socket 12 in a side schematic view with a golf ball 20 inserted therein. The socket 12 is formed between a top layer 14 and a bottom layer 16, preferably spaced apart by 10 to 20 mm, preferably substantially 14.5 mm. The top layer incorporates a top hole 22 which is larger than a golf ball, so that the ball can easily pass therethrough. The bottom layer incorporates an orifice 24, of diameter 25 to 40 mm (preferably substantially 32 mm) in which an inserted golf ball sits. The circumference 28 of orifice 24 is provided with a 45 to 75 degree, preferably substantially 60 degree, bevel.

Aligned with the top surface of the bottom layer 16 and at or adjacent the edge 28 of the orifice 24 is an optical sensor 30 for detecting the presence of a golf ball.

Closely surrounding the ball 20 in the socket is a charging coil 32 for inductively coupling with a coil 26 within the ball to charge a battery 40 therein. The ball also includes an aerial coil 36 for communicating with other devices of the ball game apparatus.

The optical sensor 30 and the coil 32 are connected to a printed circuit board 44 located on the top surface of the bottom layer 16 and itself connected to a control device of the apparatus.

In use, golf balls which have been used in play are inserted in the sockets 12 of tray 10. The balls are quickly and accurately located in the bevelled orifices 24 so that they reliably interact with sensors 30 and coils 32. A plurality of, for example, six trays are stacked in respective shelves in a rack and connected up to the control device. Thus a single battery charger is capable of simultaneously charging up to ninety golf balls. The status of the ball in each socket is then assessed. In particular, the charger can monitor for each ball its temperature, voltage and state of charge. When each battery is fully charged, the charger stops charging it. The charger knows where each ball is within the charger, and how long it has been there.

The control device has means for indicating the detected status of each ball. If a ball is in its off condition, it is switched on by the socket 12 by means of a magnetically-operated switch within the ball.

It is assessed whether the ball is faulty in any aspect. It is assessed whether the battery within the ball is only partly discharged or substantially fully discharged; in accordance with the result of this assessment, the battery is subjected to charging at a low rate or a relatively higher rate. A typical charging cycle takes eight hours.

If a socket 12 is empty, then no charging current is connected to the respective coil 32; this conserves energy and is a safety feature in that excessive heating is avoided. The temperature at each socket and/or of each tray is detected and the charging rate profile is changed as necessary; it has been found that charging in pulses prevents the arrangement from overheating.

A central database, referred to below, stores a count of the number of times each ball has been charged. If the battery in the ball is subjected to a full charging procedure, this count is incremented by one; this enables a check to assess whether it is appropriate to dispose of the battery in a particular ball.

When the battery-charging procedure has been completed, the circuitry within each ball is switched to an "off" condition in which it is completely dormant. Before a ball is issued to a player, it is activated by an activator device of the ball game apparatus.

The ball game apparatus makes wireless communications with the balls via communication devices designated as "beacons" which are distributed around the facility. One example uses Bluetooth technology. (Bluetooth is a Registered Trade Mark). Each beacon has its own identification code which is used in all communications.

Figure 4:
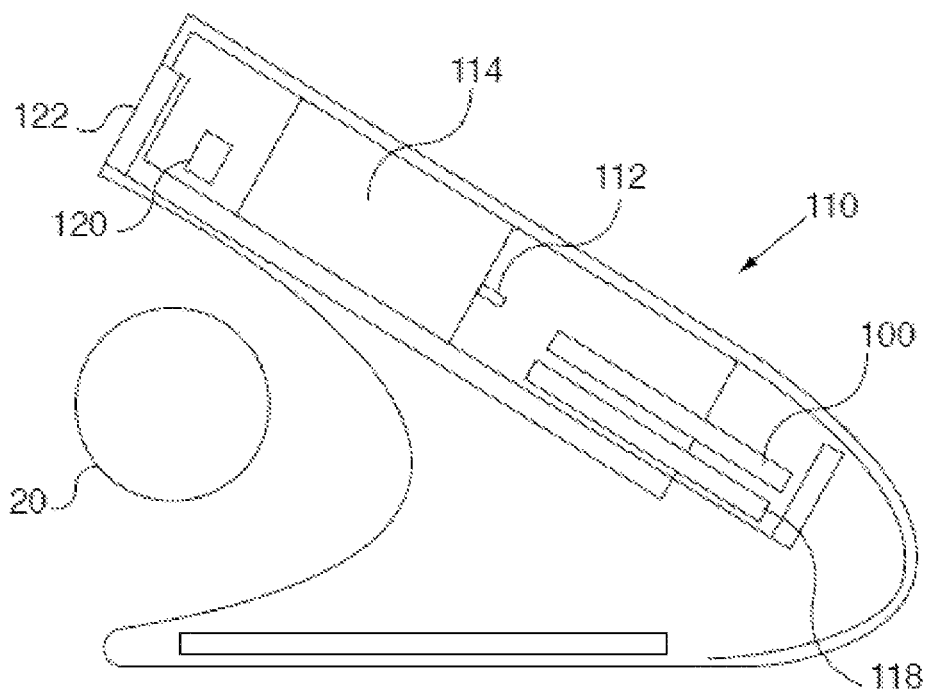
FIG. 4 is a side schematic view of an activating device for a coded golf ball, where relationships between internal and external elements are shown.

One such beacon 100 is employed in the portable ball activator unit 110 shown in FIG. 4 which can be located on a desk in the reception area of the facility. The device 110 comprises an aerial coil 112 which surrounds a cavity 114 and which is in communication with the beacon 100. The activator unit 110 is controlled by circuitry 118 incorporating a microprocessor which is also connected to the beacon 100.

The circuitry 118 is also connected to an indicator LED light 120 which is located behind a bezel 122.

The beacons 100 are all in communication with a central control unit which is associated with a membership database which retains all the players' details, current scores, previous scores, details of items purchased etc.

In use, and before a golf game is started, a ball 20 is inserted in cavity 114. The circuits within the ball and the beacon communicate with each other via coils 36 and 112. When the activator has detected the presence of ball circuitry which is switched off, it is then switched on for play. A player code is then associated with the ball so that, during a game of golf, the respective player can be unambiguously identified by the control unit via the beacons disposed around the facility. It should be noted that this player code is in addition to the previously mentioned ball code. This association of codes is effected by the central control unit in conjunction with the database.

At the same time, profiles can be assigned to the ball. One example of profiling is identifying whether the player using the ball is an adult or a child. If a ball is allocated to a child, the rules of the game may be simplified when applied to that ball. Other sorts of profiling relate to the particular golf course being played. The ball is then removed from the cavity and a putting game is subsequently played.

Figure 5:
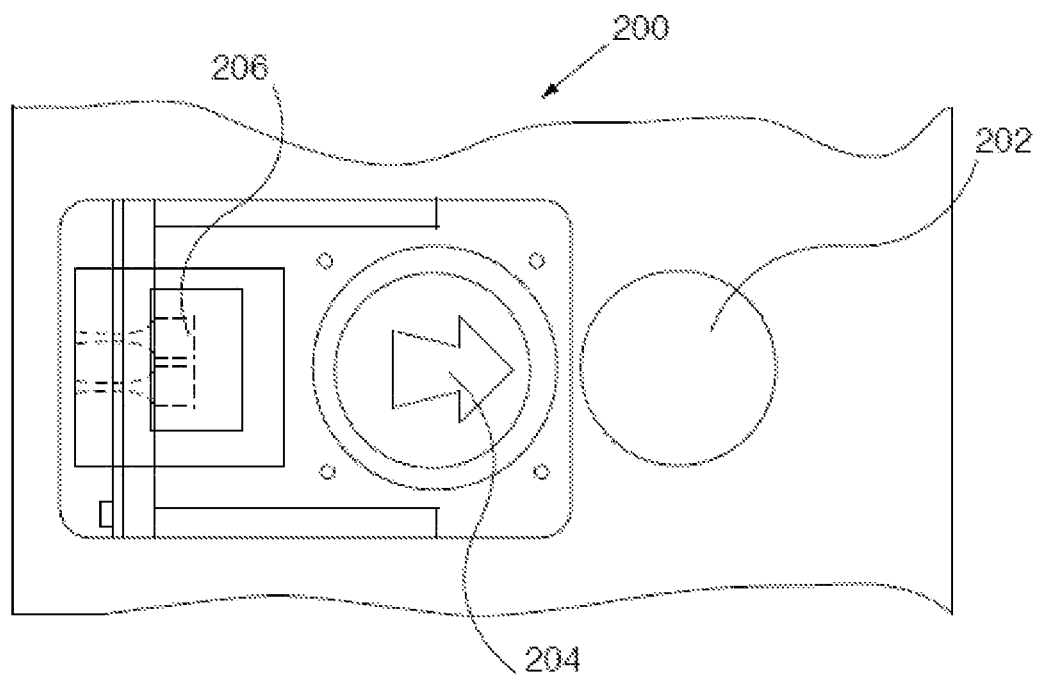
FIG. 5 is a top view of a tee area of a golf facility employing the ball game apparatus.

To start a putting game, the ball 20 is taken to the first tee area 200 of the course, shown in FIG. 5.

The tee comprises a ball placement area 202, the location of which is highlighted by an illuminated arrow 204. The presence and code of the ball 20 are detected by a respective beacon 206 located beneath ground level to one side of the ball placement area (including behind or in front of the ball placement area).

As the ball is struck during the putting game, movements of the ball are detected by beacons around the course as disclosed in WO 2013/156778 and the strokes are counted. The beacons can also detect movement of the ball into the hole on each green. However, for quicker and more accurate detection, each hole around the course includes an optical ball detector.

As the ball is moved around the golf course, communications with the adjacent beacon(s) depend upon the distance of the ball therefrom. The beacons serve as transponders passing information to and from the located ball.

Firstly, the ball is configured to transmit, for most of the time, data signals with low power and only to use higher power signals when necessary. This lengthens battery life and reduces signal clash or chatter between different devices, which in turn minimises interference delays. When the ball is not in play, it transmits with low power. When the ball is placed on the tee, it continues to transmit with low power, since it is located close to the beacon 206. It is only when the ball leaves the tee that is starts transmitting with high power so that is can be detected by the or each other beacon associated with that part of the golf course. Thus, if there are one hundred balls allocated to players, most of them at any one time transmit on low power and typically only eighteen on high power.

Secondly, the beacons also function with varying power levels. They are configured to passively receive data from the balls (and other devices) for most of the time, and only transmit information back, when required, and then at the lowest possible power level.

In use, when a ball is struck, it emits a signal to interrogate nearby beacons. Upon receiving this signal, a nearby beacon uses a dynamically-varying signal power strength to identify the location and distance of the aerial coil 36 in the ball. Using RSSI (received signal strength indication) techniques, the beacon can detect the proximity of a ball to an accuracy of between 10 cm and 10 m depending upon the system configuration. A beacon can use triangulation and/or trilateration techniques to refine location sensing.

The detection field for each beacon is shaped by the use of a tailored antenna design for use with 2.4 GHz and other frequencies. The beacon can be activated by the proximity of a ball, by an external sensor or another remote device. The beacon can emit polling signals when required. In addition to balls, they can detect any other device in the same system; in addition they can communicate with other beacons and other devices via direct wire, wirelessly or over the computer network.

At the end of a game, the ball may be re-inserted in cavity 114. Appropriate data may be downloaded from the ball to the system and the ball is switched off.

The beacons adjacent the tee areas, the hole areas and around the course are connected to a central control unit in the form of a server. The use of more than one beacon to detect signals emitted by a ball enables the position of the ball to be more precisely triangulated. Since several games are played at the same time, clashes can arise between simultaneous messages from different beacons. In this case the server detects the clash and instructs the respective beacons to resend the message, but assigns different delay times to each beacon, so that the resent messages do not clash.

A preferred polling period for the beacons is 100 to 105 ms; in preferred embodiments this period can be varied.

Apparatus in accordance with the present invention is particularly suitable for use in a game of novelty golf having various dynamic features which can be altered. Thus at a particular stage of a game, the system may turn on a light.

If there is a particular feature which a player must negotiate to successfully complete a hole e.g. a bridge, then the system may move the bridge. The timing of such interventions takes into account the position of the ball and/or the level of difficulty applied to the player, e.g. adult/child. The timing may also take into account the current state of play, for example, if a particular player is in the lead, the system may make the game harder, e.g. by moving obstacles, for that player.

Magnets may be distributed around the course for example, where a ball can travel along one of, say, three paths to arrive at the hole, a different pattern of magnets can be located beneath each path. The paths may comprise different bridges and/or tunnels. The magnetometers or compasses contained in the balls can be used to detect which path is followed and supply the information to the server; the server can use the information to award extra points or to impose penalties or to alter the layout of the moveable features of the course. In some embodiments this is the sole or main purpose of the magnetometers or compasses within the balls, with the gyroscopes solely or mainly serving to monitor overall movements of the balls.

In a preferred embodiment, video cameras are distributed around the course. They are used to constantly record shots being played around the course. A video display screen in the reception area of the facility can be used to play back selected events. For example, if cheating is suspected, it can quickly be checked on screen. Moreover, if a prize is awarded for a special event, such as a hole-in-one on a particular hole, a claim can immediately be validated on screen. It is particularly preferred that every part of the course is video-monitored from the moment the ball is struck until it is in the hole. Thus, an entire round can be recorded and subsequently replayed (possibly speeded up) to check the score. Video replays can also be shared by players on social media.

One or more video display screens may be distributed around the course. In particular, each hole may have its own computer and screen combination including an associated beacon. If a particularly good shot is played, it may be detected by the beacons and immediately replayed on the display screen nearest to the relevant hole.

Various modifications can be made to the above-described embodiments.

With regard to the charging procedure, the battery may be in an "off" condition while it is being charged. Switching between the "on" and "off" conditions may be effected automatically upon detection of a voltage increase in the charging coil 32 rather than by a separate magnetic switch.

The beacon 206 at the tee area may be located underneath the ball placement area 202.

Instead of being portable, the activator device may be part of a fixed apparatus, for example a ball dispensing machine. After payment of a fee, and entry of relevant details of a player on a keypad, a ball 20 can be dispensed.

To avoid clashing of messages from different beacons, a frequency-hopping technique may be employed in addition to or as alternative to varying the delay time of subsequent messages.

The coded ball 20 can be used for additional purposes to playing a game. For example, it can be arranged to operate vending machines around the facility, e.g. to buy a drink or to purchase another game, with an appropriate charge being made to a player's account. It can also be used to control features of the game, in the manner of "playing a joker". Thus, in a points scoring game, one could present one's ball to a dedicated reading device adjacent to a hole to increase (eg double) one's score at that hole.

Playing of the game can be enhanced by implementing some or all of the above features, in addition to further features, on an application which can be downloaded to a player's mobile telephone or other mobile communications device. The playing of the game can be influenced in various ways. Examples are moving part of the golf course (either to make one's shot easier or to make an opponent's shot harder), switching on a fan to blow wind across the playing area, causing a model volcano to make an appropriate noise to distract an opponent.

An antenna arrangement may be provided at an exit to the facility to detect an attempt to steal a ball. A beacon may be incorporated into this arrangement so that the memory within the ball is erased or replaced with a code indicating unauthorised removal.

Features of the apparatus may be combined with or modified by any of the features disclosed in WO 2013/156778 and/or in co-pending application number GB 1512038.9 entitled Ball for Game, the contents of all of which are hereby incorporated by reference.

What is claimed is:

1. A golf game system comprising:
   a plurality of coded balls each of which comprises a circuit that includes a chargeable battery and a coil for charging the battery and a ball aerial coil configured to transmit signals for communication;
   a plurality of detector units configured to communicate with the ball aerial coil of each of the plurality of coded balls to detect movement of the plurality of coded balls;
   a battery-charging tray defining a plurality of orifices that correspond with a plurality of ball-holding locations and are configured to receive the plurality of coded balls, wherein the tray comprises:
      a plurality of sensors each of which is located at a respective one of the plurality of ball-holding locations to detect whether one of the plurality of coded balls is at the respective one of the plurality of ball-holding locations; and
      a plurality of charging coils each of which is located at a respective one of the plurality of ball-holding locations and is configured to charge a respective one of the plurality of coded balls located at the respective one of the ball-holding locations by inductively coupling to the coil of the respective one of the plurality of coded balls; and
   an activator unit defining a cavity through which the plurality of coded balls are capable of traveling and comprising an activator aerial coil adjacent to the cavity, wherein the activator aerial coil is configured to communicate with the ball aerial coil of each of the plurality of coded balls as each respective one of the plurality of coded balls travels through the cavity, wherein the activator unit is configured to transition a respective one of the plurality of coded balls between an "on" condition and an "off" condition upon the respective one of the plurality of coded balls traveling through the cavity, wherein, for each of the plurality of coded balls, the activator unit is configured to switch the coded ball from the "off" condition to the "on" condition at a start of a game and switch the coded ball from the "on" condition to the "off" condition at an end of the game.

2. The golf game system of claim 1, further comprising a central control unit and a database.

3. The golf game system of claim 2, wherein the database is configured to store a respective ball code for each of the plurality of coded balls and a respective player code for each of a plurality of players, and wherein the database is configured to associate the player code of one of the plurality of players with the ball code of one of the plurality of coded balls.

4. The golf game system of claim 2, wherein the database is configured to store data indicative of movement of each of the plurality of coded balls.

5. The golf game system of claim 2, wherein the database is configured to store data indicative of a history of charging cycles for each of the plurality of coded balls.

6. The golf game system of claim 2, wherein the central control unit is a server.

7. The golf game system of claim 2, wherein the activator unit comprises a beacon that is configured to communicate with the central control unit.

8. The golf game system of claim 7, wherein the activator unit comprises circuitry connecting the activator aerial coil and the beacon.

9. A golf game system comprising:
   a central control unit with a database;
   coded balls each of which comprises a rechargeable battery and a ball antenna for communication;
   detector units arranged around a course, each of the detector units configured to communicate with the central control unit and the ball antenna of each of the coded balls to detect movement of the coded balls;
   a tray with ball-holding locations, wherein, for each of the ball-holding locations, the tray comprises a respective charging coil configured to inductively charge one of the coded balls and a sensor configured to detect a presence of one of the coded balls; and
   an activator unit defining a cavity through which the coded balls are capable of traveling and comprising an activator antenna that is adjacent to the cavity, wherein the activator unit is configured to communicate with the ball antenna of a respective one of the coded balls as the respective one of the coded balls travels through the cavity to transition the respective one of the coded balls between an "on" condition and an "off" condition, wherein, for each of the coded balls, the activator unit is configured to switch the coded ball from the "off" condition to the "on" condition at a start of a game and switch the coded ball from the "on" condition to the "off" condition at an end of the game.

10. The golf game system of claim 9, wherein the database is configured store a respective ball code for each of the coded balls and a respective player code for each player, and wherein the database is configured to associate the player code of each player with a ball code of a respective one of the coded balls.

11. The golf game system of claim 9, wherein the database is configured to store data indicative of movement of each of the coded balls and indicative of a history of charging cycles for each of the coded balls.

12. The golf game system of claim 9, wherein the central control unit is a server.

13. The golf game system of claim 9, wherein the activator unit comprises a beacon antenna that is configured to communicate with the central control unit.

14. The golf game system of claim 13, wherein the activator unit comprises circuitry connecting the activator antenna and the beacon antenna.

15. A golf ball system comprising:
coded balls each of which comprises a rechargeable battery and a ball antenna for communication;
a tray with ball-holding locations, wherein, for each of the ball-holding locations, the tray comprises a respective charging coil configured to inductively charge one of the coded balls and a sensor configured to detect a presence of one of the coded balls; and
an activator unit defining a cavity through which the coded balls are capable of traveling and comprising an activator antenna that is adjacent to the cavity, wherein the activator unit is configured to communicate with the ball antenna of a respective one of the coded balls as the respective one of the coded balls travels through the cavity to transition the respective one of the coded balls between an "on" condition and an "off" condition, wherein, for each of the coded balls, the activator unit is configured to switch the coded ball from the "off" condition to the "on" condition at a start of a game and switch the coded ball from the "on" condition to the "off" condition at an end of the game.

16. The golf ball system of claim 15, wherein the activator unit comprises a beacon antenna that is configured to communicate with a server.

17. The golf ball system of claim 16, wherein the activator unit comprises circuitry connecting the activator antenna and the beacon antenna.

\* \* \* \* \*